No. 873,097. PATENTED DEC. 10, 1907.
A. SAUER.
SHAFT BEARING.
APPLICATION FILED JAN. 17, 1905.
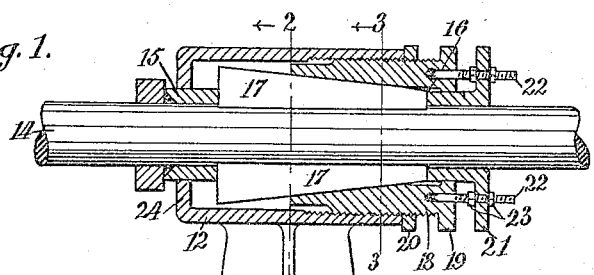
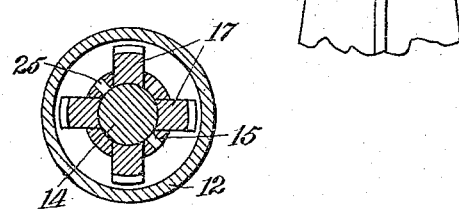
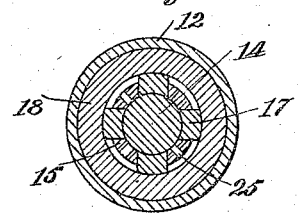
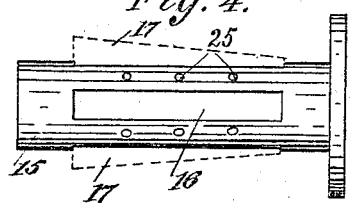
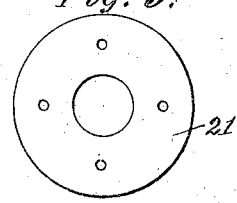
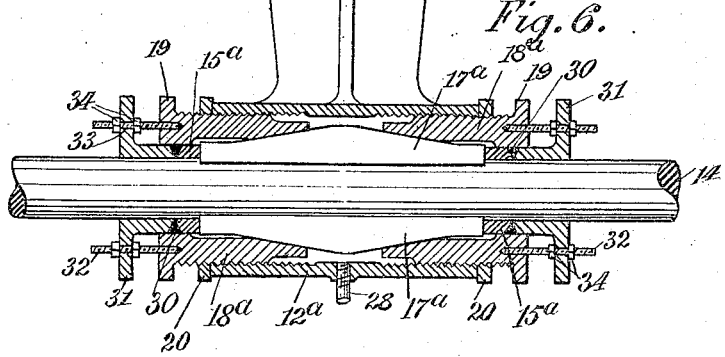
Witnesses:
S. C. Yeaton, Jr.
V. Braun.
Adelbert Sauer, Inventor
by Schreiter & Mathews
his Att'ys

UNITED STATES PATENT OFFICE.

ADELBERT SAUER, OF PITTSBURG, PENNSYLVANIA.

SHAFT-BEARING.

No. 873,097.  Specification of Letters Patent.  Patented Dec. 10, 1907.

Application filed January 17, 1905. Serial No. 241,474.

*To all whom it may concern:*

Be it known that I, ADELBERT SAUER, a citizen of the United States, and resident of Pittsburg, county of Allegheny and State of Pennsylvania, have invented certain new and useful Improvements in Shaft-Bearings, of which the following is a full, clear, and exact specification, reference being had to the accompanying drawings, illustrating a bearing embodying my invention, wherein—

Figure 1 is a vertical longitudinal section through the bearing; Fig. 2 is a transverse section on line 2—2, indicated in Fig. 1; Fig. 3 is a transverse section on line 3—3, indicated in Fig. 1; Fig. 4 shows the sleeve for carrying the bearing blocks and Fig. 5 an end view of the same; Fig. 6 is a transverse longitudinal section through a form of bearing having means for adjusting the bearing blocks at both ends of the bearing.

This invention relates to adjustable shaft bearings and has for its object to provide means whereby a set of bearing members or blocks can be adjusted in a radial direction to compensate for wear, and to insure a proper alinement of the shaft.

Referring now to Figs. 1, 2, 3, 4 and 5, the casing or shell 12 of the bearing is carried by a suitable support 13. On the shaft 14 is loosely fitted a sleeve 15, shown separately in Fig. 4, provided with slots 16. In these slots are inserted the bearing blocks 17, to slide freely therein and so as to be adjustable relatively to shaft 14. At one end of the shell 12, a thimble 18 is placed between the shell and the bearing blocks 17; the engaging surfaces between these three parts being so arranged that according to the position of the thimble 18, the blocks 17 are brought nearer to or farther from the shaft 14. The preferred construction for this purpose is to make the bearing blocks 17 wedge-shaped, their outer faces engaging the thimble 18, being at an angle to the axis of the shaft, rounded and tapering towards the end of shell 12 engaging the thimble 18. Thus the outer faces of the four blocks 17 are parts of a cone. The bore of thimble 18 is also made tapering or conical, correspondingly to the outer faces of blocks 17. The preferred means for moving the thimble 18 upon the blocks 17 to thereby move them towards the shaft is by screw-threading the thimble 18 externally, and the shell 12 internally. The outer shape of thimble 18 is cylindrical, and the interiorly screw-threaded shell 12 thus engages the thimble and it then moves inwardly when rotated. By thus rotating the thimble 18, the blocks 17 are accurately adjusted to insure a proper engagement with the shaft and compensate for wear. For more convenient turning of the thimble 18, an annular flange 19 is provided at its outer end. This enables the thimble to be engaged with a spanner or wrench.

Threaded ring 20 set on the thimble 18 may be used to screw up against the end of the shell, after the thimble has been adjusted, as a lock nut, to prevent its displacement. Another means provided for locking the thimble 18 comprises the annular flange 21 on the end of the sleeve 15, through which pass a number of bolts 22, that bear on the flange 19 of the thimble 18; nuts 23 on the bolts on each side of the flange, serve to force the bolts against the flange and lock them in place, thus securing the thimble in position after it has been adjusted. On the other end of shell 12 there is an annular flange 24 extending inwardly and fitted upon sleeve 15. The space inclosed by flange 24 is utilized for storing oil to lubricate the bearing. Lubricating oil may be fed into this chamber from a tank, by a pipe tapped in the shell 12. The oil passes from there to the shaft through apertures 25 (see Fig. 4) in the portions of the sleeve 15 between the slots for the bearing blocks 17. The drippings of the lubricating oil may be drawn off from the bottom of shell 12 by another pipe, (as shown in Fig. 6 and designated by numeral 28,) and fed back into the tank by a pump or other such device.

In Fig. 6 is shown a modified form of my improved bearing, in which each of the bearing blocks is provided with separate means of adjustment at each end of the bearing. It comprises a supporting shell 12$^a$, inside of which is a sleeve 15$^a$ having longitudinal slots wherein the bearing blocks 17$^a$ are inserted. Their outer faces are rounded and conically inclined to both ends, the blocks thus forming a double ended cone. The outer faces of the blocks are engaged by the externally screw-threaded thimbles 18$^a$ at each end of the shell. Thimbles 18$^a$ are threaded into the shell 12$^a$ like the thimble 18 in the other construction, and their bores are correspondingly conical to engage the blocks 17$^a$. By these means each end of the blocks 17$^a$ can be adjusted onto each end of the shaft. This bearing is also provided with an oil chamber. To prevent escape of the oil, packing rings 30 of suitable material are placed at each end of the sleeve 15ª and secured in place by flanged collars 31. Bolts 32 secured in the adjustable thimbles 18ª pass through bores 33 provided in the flanges of collars 31, and lock nuts 34, two on each bolt, engage the flange from each side thus securing the collars 31 in permanent position relatively to the other parts of the bearing.

I claim as my invention:—

1. A shaft bearing comprising a shell interiorly screw-threaded at one end, a slotted sleeve loosely fitted on the shaft, wedge-shaped bearing blocks set in the slots, a thimble having its bore tapering and thereby engaging the blocks, the thimble being exteriorly screw-threaded and thereby engaging the threaded shell, there being a flange on one end of the sleeve, bolts secured to the flange and arranged to engage the thimble, and lock nuts on the bolts engaging the flange, substantially as herein shown and described.

2. A shaft bearing comprising a slotted sleeve loosely fitted on the shaft, bearing blocks set in the slots, the outer faces of the blocks being inclined towards each end, a shell, thimbles one at each end of the shell located between the inclined faces of the bearing blocks and the shell, and provided with means for moving the thimbles to adjust the blocks, substantially as herein shown and described.

3. A shaft bearing comprising a shell interiorly screw-threaded at each end portion, a slotted sleeve loosely fitted on the shaft, bearing blocks set in the slots, the outer faces of the blocks being inclined towards each end; thimbles, one at each end of the shell, having their bore made tapering and engaging the blocks by their inclined faces, the thimbles being externally screw-threaded and thereby engaging the threaded shell, substantially as herein shown and described.

ADELBERT SAUER.

Witnesses:
C. J. HOFFMANN,
L. P. HOFFMANN.